Patented June 20, 1939

2,163,238.

UNITED STATES PATENT OFFICE 2,163,238

PROCESS FOR THE MANUFACTURE OF POLYMER CARBOXYLIC ACIDS AND DERIVATIVES THEREOF

Karl Hamann, Krefeld-Uerdingen, Germany, assignor to I. G. Farbenindustrie Aktiengesellschaft, Frankfort-on-the-Main, Germany No Drawing. Application June 18, 1938, Serial No. 214,571. In Germany June 23, 1937

18 Claims. (Cl. 260—84)

This invention relates to a process for the manufacture of polymeric carboxylic acids and derivatives thereof.

According to the U. S. Patent 2,094,213 crotylidene cyanacetic acid compounds are polymerised in the presence of an alkaline condensing agent.

Among the crotylidene cyanacetic acid compounds suitable for the process of the above-mentioned U. S. Patent 2,094,213 may be mentioned the salts of crotylidene cyanacetic acid soluble in water, for example the ammonium salt, the alkali metal salts, such as the sodium salt and the potassium salt, the earth alkali metal salts, as for example the calcium salt, strontium salt and barium salt, the salts with organic bases, thus for example with methyl amine, triethyl amine, dipropyl amine and piperidine, the esters of crotylidene cyanacetic acid, such as the methyl ester, ethyl ester, propyl ester, butyl ester, isobutyl ester, amyl ester, esters with the mixtures of alcohols obtainable by the catalytical reduction of carbon monoxide, said alcohols corresponding mainly to the formula $C_4H_9OH$ to $C_7H_{15}OH$, furthermore dodecyl ester, octadecyl ester, esters of unsaturated alcohols, such as oleic alcohol, benzyl ester, glycol ester, glycerine ester, the amides of crotylidene cyanacetic acid, for example crotylidene cyanacetic acid amide itself, crotylidene cyanacetic acid methyl amide, crotylidene cyanacetic acid diethyl amide etc.

As examples for alkaline condensing agents suitable for the polymerising process of the U. S. Patent 2,094,213 may be mentioned alkali metal hydroxides, for example sodium hydroxide, potassium hydroxide, lithium hydroxide, alkali metal carbonates, such as sodium carbonate and potassium carbonate, hydroxides of alkali earth metals, such as calcium hydroxide, strontium hydroxide, barium hydroxide, finally ammonia and organic bases, such as dimethyl amine, trimethyl amine, diethyl amine, piperidine and the like.

When employing bases, such as for example piperidine, diethyl amine, triethyl amine etc. which are soluble in the starting material to be polymerised, the process of the above-mentioned U. S. Patent can be carried out in the absence of a solvent. In other cases a solvent can be employed, in which both the material to be polymerised and the bases are soluble. Such solvents are, for example, when employing alkali metal hydroxide as condensing agents water and ethyl alcohol, when employing for example amines of the kind mentioned before as condensing agents organic solvents, such as alcohols, for example, methyl alcohol, ethyl alcohol, propyl alcohol, esters, such as ethyl acetate, butyl acetate, ethers, such as diethyl ether, glycol ethyl ether, hydrocarbons, such as benzine, benzene, toluene, ligroine etc.

Alternatively the polymerisation can be effected in an emulsion, especially in an aqueous emulsion. In the latter case it is to be recommended to employ an emulsifying agent, such as for example dodecyl trimethyl ammonium hydroxide, alkali metal sulfonates of polyalkylated hydrocarbons, such as the salts of diisopropyl naphthalene sulfonic acid or dibutyl naphthalene sulfonic acid, salts of sulfonated fatty acids and especially the products obtainable by the action of ethylene oxide on hydroxyl derivatives of compounds possessing long aliphatic chains, for example octadecyl alcohol or castor oil.

The resilient polymerisates obtained according to the process of the U. S. Patent 2,094,213 exhibit considerable solubility in organic solvents, as for example, aromatic hydrocarbons, esters, ketones etc.

In accordance with the present invention polymerisation products of crotylidene cyanacetic acid compounds are obtained which are essentially distinguished in technically valuable properties, and on this account in their region of application, from the specified products. In the process of this invention the above specified polymerisation is carried out in such a manner that a crotylidene cyanacetic acid compound which comprises only one radicle of the acid, for example a salt, an ester or an amide of the type mentioned before is polymerised in the presence of a crotylidene cyanacetic acid compound which comprises the acid radicle at least twice in the molecule.

As compounds of the last mentioned type accordingly come into question compounds which are obtainable by interaction of crotylidene cyanacetic acid with such compounds as contain two or more functional groups capable of reacting with acids. Among the compounds of this type may be mentioned, for example, the esters of crotylidene cyanacetic acid with polyhydric alcohols, such as glycol, propylene glycol, butylene glycol, diglycol, glycerol and trimethylol propane, the amides derived from di- or polyamines, such as ethylene diamine, trimethylene diamine, phenylene diamine, the salts derived from di- or polyvalent bases, such as calcium salt, strontium salt, barium salt, aluminium salt and zinc salt.

The quantities of the additions can vary within wide limits. Good results are obtained, for example, with additions of 0.01–40% by weight, calculated to the product to be polymerised and especially 0.1–10% by weight.

The temperature during the reaction may vary to the conditions. I have obtained good results with temperatures above 0°, more especially with temperatures ranging from about room temperature to about 30° C., the upper limit of the reaction temperature and the corresponding pressure being only given by the decomposition point of the components of the reaction mixture.

The alkaline condensing agents to be employed need be present only in relatively small, catalytically acting quantities, for example in an amount of about 0.01 to about 20%, calculated on the amount of the compound to be polymerised. But also greater amounts may be used, the reaction velocity increasing with the amount of condensing agent employed.

The polymerisates obtained according to this invention are practically insoluble in the customary organic solvents, such as ketones, for example acetone, methylethyl ketone, diethyl ketone, cyclohexanone, esters, for example ethyl acetate, butyl acetate and organic hydrocarbons, for example benzene, toluene, xylene and solvent-naphtha. The commercially valuable properties of the polymerisates, as for example their resilience, are retained within a much wider range of temperature than in the case of polymerisates which are obtained in the absence of the said additions.

The invention is illustrated, but not restricted by the following examples; the parts are by weight.

Example 1

Into a solution of 8 parts by weight of sodium hydroxide in 2500 parts of water there is allowed to run an emulsion obtained from 278 parts by weight of the butyl ester of crotylidene cyanacetic acid, 22 parts by weight of the butylene glycol ester of crotylidene cyanacetic acid, 20 parts by weight of an emulsifier obtained by the action of ethylene oxide on castor oil and 300 parts of water. The polymerisate is washed consecutively with 1% caustic soda lye, 3% sulfuric acid and water. After drying there is obtained a white pulverulent polymerisate insoluble in benzene, acetone and ethyl acetate.

Example 2

Into a solution of 8 parts by weight of sodium hydroxide and 250 parts by weight of sodium chloride in 2500 parts of water there is allowed to flow a mixture of 280 parts by weight of the methyl ester and 20 parts by weight of the glycol ester of crotylidene cyanacetic acid, 300 parts by weight of acetone and 40 parts by weight of an emulsifier obtained by the action of ethylene oxide on castor oil.

After 15 hours' stirring the polymerisate is worked up as described in Example 1. The dried pulverulent polymerisate is insoluble in acetone and ethyl acetate.

Example 3

A mixture of 30 parts by weight of the butyl ester and 0.6 part by weight of the diglycol ester of crotylidene cyanacetic acid is treated with good stirring with 0.2 part by weight of a 25% alcoholic solution of triethanol amine. The polymerisation produces a resilient product which does not become brittle at −10° C. nor sticky at 60° C.

I claim:
1. Process for the manufacture of polymerisation products by reacting with an alkaline condensing agent upon a compound comprising one crotylidene cyanacetic acid radicle in the molecule in the presence of a compound comprising at least two crotylidene cyanacetic acid radicles in the molecule.
2. Process for the manufacture of polymerisation products by reacting with an alkaline condensing agent upon material selected from the group consisting of a salt, an ester and an amide comprising one crotylidene cyanacetic acid radicle in the molecule in the presence of a compound comprising at least two crotylidene cyanacetic acid radicles in the molecule.
3. Process for the manufacture of polymerisation products by reacting with an alkaline condensing agent upon an ester of crotylidene cyanacetic acid with a monohydric alcohol in the presence of a compound comprising at least two crotylidene cyanacetic acid radicles in the molecule.
4. Process for the manufacture of polymerisation products by reacting with an alkaline condensing agent upon an ester of crotylidene cyanacetic acid with a monohydric alcohol in the presence of an ester of crotylidene cyanacetic acid with a polyhydric alcohol.
5. Process for the manufacture of polymerisation products by reacting with alkali in aqueous emulsion upon an ester of crotylidene cyanacetic acid with a monohydric alcohol in the presence of an ester of crotylidene cyanacetic acid with a polyhydric alcohol.
6. Process which comprises reacting with sodium hydroxide in aqueous emulsion upon crotylidene cyanacetic acid butyl ester in the presence of crotylidene cyanacetic acid butylene glycol ester.
7. Process which comprises reacting with sodium hydroxide in aqueous emulsion upon crotylidene cyanacetic acid methyl ester in the presence of crotylidene cyanacetic acid glycol ester.
8. Process which comprises reacting with triethanol amine upon crotylidene cyanacetic acid butyl ester in the presence of crotylidene cyanacetic acid diglycol ester.
9. A polymerisation product of a compound comprising one crotylidene cyanacetic acid radicle in the molecule and a compound comprising at least two crotylidene cyanacetic acid radicles in the molecule.
10. A polymerisation product of material selected from the group consisting of a salt, an ester and an amide comprising one crotylidene cyanacetic acid radicle in the molecule and a compound comprising at least two crotylidene cyanacetic acid radicles in the molecule.
11. A polymerisation product of an ester of crotylidene cyanacetic acid with a monohydric alcohol and a compound comprising at least two crotylidene cyanacetic acid radicles in the molecule.
12. A polymerisation product of an ester of crotylidene cyanacetic acid with a monohydric alcohol and an ester of crotylidene cyanacetic acid with a polyhydric alcohol.
13. A polymerisation product of crotylidene cyanacetic acid butyl ester and crotylidene cyanacetic acid butylene glycol ester.
14. A polymerisation product of 278 parts by weight of crotylidene cyanacetic acid butyl ester and 22 parts of crotylidene cyanacetic acid butylene glycol ester forming a white pulverulent polymerisate insoluble in benzene, acetone and ethyl acetate.

15. A polymerisation product of crotylidene cyanacetic acid methyl ester and crotylidene cyanacetic acid glycol ester.

16. A polymerisation product of 280 parts by weight of crotylidene cyanacetic acid methyl ester and 20 parts by weight of crotylidene cyanacetic acid glycol ester forming a pulverulent polymerisate insoluble in acetone and ethyl acetate.

17. A polymerisation product of crotylidene cyanacetic acid butyl ester and crotylidene cyanacetic acid diglycol ester.

18. A polymerisation product of 30 parts by weight of crotylidene cyanacetic acid butyl ester and 0.6 part by weight of crotylidene cyanacetic diglycol ester forming a resilient product.

KARL HAMANN.